United States Patent
Maeda et al.

(10) Patent No.: US 7,805,059 B2
(45) Date of Patent: Sep. 28, 2010

(54) DATA RECORDING METHOD, DATA RECORDING APPARATUS AND IMAGE PICK-UP APPARATUS

(75) Inventors: Tetsuhiro Maeda, Tokyo (JP); Toshisada Ishii, Tokyo (JP); Kenichiro Aridome, Kanagawa (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1070 days.

(21) Appl. No.: 10/590,504

(22) PCT Filed: Oct. 14, 2005

(86) PCT No.: PCT/JP2005/018956

§ 371 (c)(1),
(2), (4) Date: Aug. 24, 2006

(87) PCT Pub. No.: WO2006/070523

PCT Pub. Date: Jul. 6, 2006

(65) Prior Publication Data

US 2007/0133954 A1    Jun. 14, 2007

(30) Foreign Application Priority Data

Dec. 27, 2004    (JP) .............................. 2004-377558

(51) Int. Cl.
*H04N 5/91* (2006.01)
(52) U.S. Cl. .......................... 386/95; 386/107; 386/117
(58) Field of Classification Search .................. 386/46, 386/95, 112, 107, 117
See application file for complete search history.

(56) References Cited

U.S. PATENT DOCUMENTS 5,991,504 A * 11/1999 Hori ........................... 386/112

2003/0072561 A1    4/2003    Terada

FOREIGN PATENT DOCUMENTS

EP    1 443 511 A2    8/2004

(Continued)

OTHER PUBLICATIONS

Software Architects Inc., "White Paper, The Universal Disk Format UDF", Internet Citation, [Online] X)002183534, retried from the Internet: URL:http://www.softarch.com> [retrieved on Aug. 6, 1998] *the whole document*.

(Continued)

*Primary Examiner*—Huy T Nguyen
(74) *Attorney, Agent, or Firm*—Finnegan, Henderson, Farabow, Garrett & Dunner, L.L.P.

(57) ABSTRACT

The present invention is directed to a data recording method of performing data recording while properly using at least two respective divided recording areas on an optical recording medium (5) in accordance with kind of data to be recorded, wherein in the case where inputted data is still picture, remaining capacity of the still picture recording area ARS is confirmed to judge whether or not remaining capacity of the video recording area ARV is larger than extension size when there is no remaining capacity of the still picture recording area ARS, whereby in the case where remaining capacity of the video recording area ARV is larger than extension size, boundary pointer is modified, and recording data management information and file system information are modified to thereby extend the still picture recording area ARS to record still picture data into the still picture recording area ARS to update recording data management information and/or file system information of management are ARM as occasion demands after recording is completed.

3 Claims, 10 Drawing Sheets

FOREIGN PATENT DOCUMENTS

| | | |
|---|---|---|
| JP | 04-170765 | 6/1992 |
| JP | 2001-043631 | 2/2001 |
| JP | 2004-022043 | 1/2004 |
| JP | 2004-213769 | 7/2004 |
| JP | 2004-318923 | 11/2004 |
| WO | WO 2004/057599 A | 7/2004 |
| WO | WO 2004/061844 | 7/2004 |
| WO | WO 2004/086373 A | 10/2004 |

OTHER PUBLICATIONS

European Search Report from European Patent Office dated Jan. 13, 2009, for Application No. 05793080.2-2223 / 1713072 (PCT/JP2005018956), 15 pages.

* cited by examiner

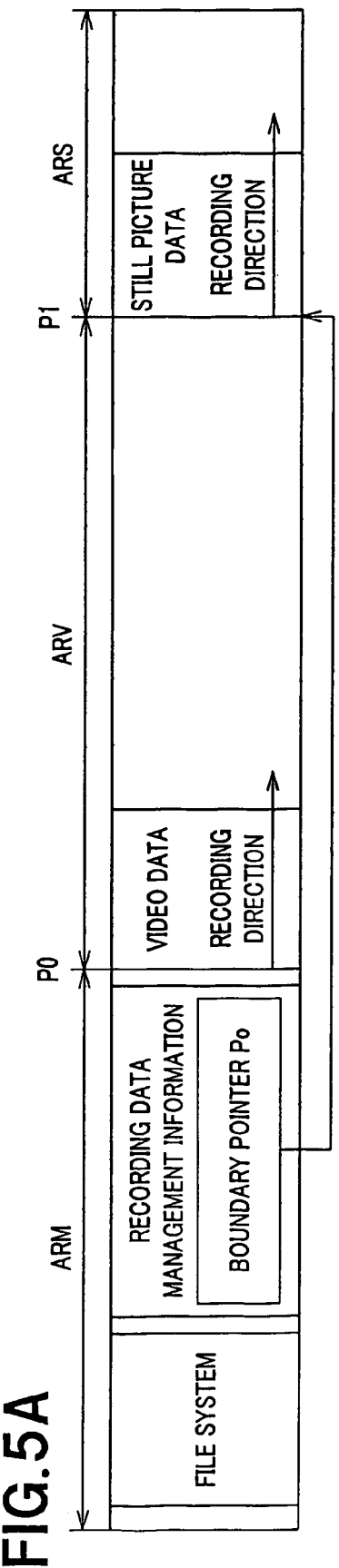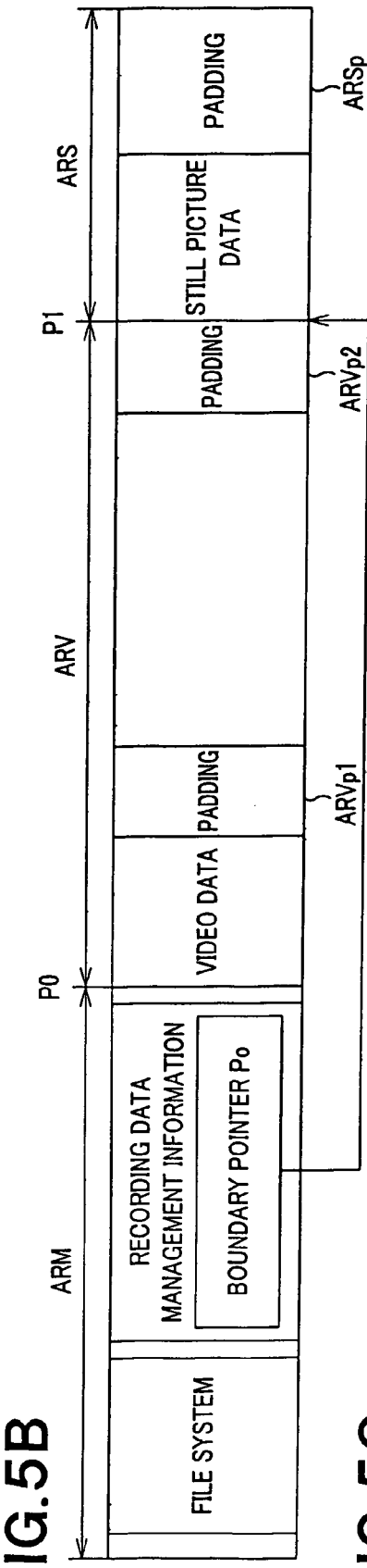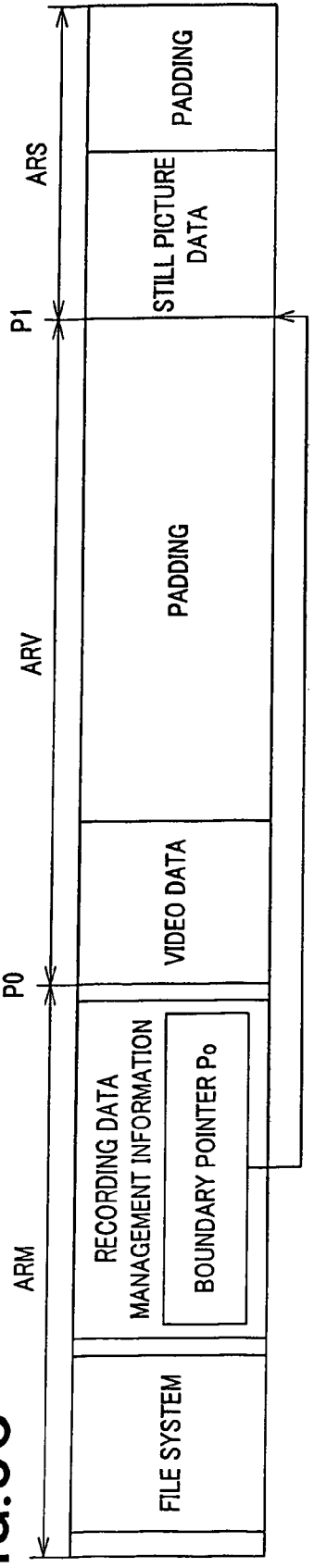

DATA RECORDING METHOD, DATA RECORDING APPARATUS AND IMAGE PICK-UP APPARATUS

TECHNICAL FIELD

The present invention relates to a data recording method, a data recording apparatus and an image pick-up apparatus which are adapted for recording data with respect to recording medium, e.g., DVD (Digital Versatile Disc), etc.

This Application claims priority of Japanese Patent Application No. 2004-377558, filed on Dec. 27, 2004, the entirety of which is incorporated by reference herein.

BACKGROUND ART

Hitherto, as an apparatus for recording recorded pictures of television broadcast and/or photographed images, in place of video tape recorder, there are used DVD recorders using, as recording medium, DVD (Digital Versatile Disc) of the recording/reproducing type capable recording/reproducing data. The recording/reproducing type DVD is an optical disc having dimensions in which the diameter is caused to be 12 cm and the thickness is caused to be 1.2 mm and having recording capacity of 4.7 G bytes at one side surface.

As the recording/reproducing type DVD, there are proposed five kinds of formats of DVD-R, DVD-RW, DVD+RW, DVD+R and DVD-RAM including both the write-once type DVD capable of performing only one recording operation of data and the rewrite type DVD capable of re-recording data. These formats are proposed from "DVD Forum" which is the civil standardization organization and "DVD+RW Alliance" which is civil standardization organization different from the DVD Forum.

DVD-R and DVD+R are write once type optical disc capable of performing only once write operation of data. DVD-R is an optical disc in accordance with the format proposed by the DVD Forum, and DVD+R is an optical disc in accordance with the format proposed by DVD+RW Alliance.

DVD-RW and DVD+RW are plural times rewritable optical discs capable of re-recording data in which format compatibility with reproduction only DVD (DVD-VIDEO) prescribed by the "DVD Forum" is taken. Even in the case of conventional reproduction only DVD player, DVD-RW and DVD+RW can be reproduced. The DVD-RW is an optical disc in accordance with the format proposed by the DVD Forum, and the DVD+RW is an optical disc in accordance with the format proposed by the DVD+RW Alliance.

The DVD-RAM is a rewritable optical disc in a form accommodated within cartridge, and having low compatibility with the DVD-VIDEO. The DVD-RAM is an optical disc having format greatly different from those of other DVDs. The DVD-RAM is an optical disc proposed by the DVD Forum.

In addition, in the DVD-VIDEO standard proposed by the DVD Forum, unit called "title" is prescribed as data unit. The "title" prescribed by this standard is the concept indicating reproduction unit of one contents, e.g., one screen achievement of cinema (movie) or one work of music album, etc. In the DVD-VIDEO standard, it is supported that as far as 99 titles can be recorded with respect to one DVD disc (e.g., see Japanese Patent Application Laid Open No. 2004-318923 publication).

DISCLOSURE OF THE INVENTION

Problems to be Solved by the Invention

Meanwhile, in the case of recording data with respect to an optical recording medium, there is a method in which the recording area is divided or separated depending upon its use purpose to properly use respective divided areas. For example, in the case of recording moving picture (image) and still picture (image) with respect to a recording medium by, e.g., camera system, etc., there is employed an approach, as shown in FIG. 1, to record moving picture into recording area A and to record still picture into recording area B, thereby making it possible to separately handle respective data different in use purpose. In such a recording method, the boundary position between the recording area A and the recording area B is pointed out by pointer Po described in the management area existing except for the recording areas (hereinafter this pointer will be referred to as boundary pointer Po).

Here, in the conventional recording method, value of the boundary pointer Po which points out or indicates the boundary between the recording area A and the recording area B is fixed at a value designated at the time of initialization of recording medium. For this reason, in the case where, e.g., certain kind data b is recorded into the recording area B so that the recording area B has been completely used, even if empty area sufficiently exists in the recording area A for recording other kind data a, it is impossible to record data b in a manner beyond than that. As a result, in the conventional recording method, there takes place the problem that utilization ratio of respective data would be fixed with respect to users who utilize recording media so that the recording area of the recording medium cannot be effectively utilized depending upon what intention user has.

In view of the problems as described above, an object of the present invention is to provide a data recording method, a data recording apparatus and an image pick-up apparatus in which, in performing data recording while properly using respective two divided recording areas in accordance with kind of data to be recorded, those divided two areas can be effectively utilized.

The present invention is directed to a data recording method of performing data recording while properly using at least two respective divided recording areas on an optical recording medium in accordance with kind of data to be recorded, wherein in the case where it is judged that remaining capacity of one recording area has become equal to zero, the area having a remaining capacity is assigned to the area where the remaining capacity has become equal to zero to thereby extend the one area to allow occupation ratio of the respective areas to be variable to separately record data different in kind.

Moreover, the present invention is directed to a data recording apparatus adapted for performing data recording while properly using at least two respective divided recording areas on an optical recording medium in accordance with kind of data to be recorded, the data recording apparatus comprising an area management unit for performing management of remaining capacities of the respective recording areas, whereby in the case where it is detected that remaining capacity of one recording area has become equal to zero, the area having a remaining capacity is assigned to the area where the remaining capacity has become equal to zero to thereby the extend one area to allow occupation ratio of the respective areas to be variable, thus to perform management of remaining capacities of the respective recording areas by the area management unit to perform data recording while properly using the respective recording areas in accordance with kind of data to be recorded.

Further, the present invention is directed to an image pick-up apparatus comprising a recording unit for recording, onto an optical recording medium, a moving picture video signal and a still picture video signal which are obtained by an image pick-up unit, the recording unit comprising an area management unit for performing management of remaining capacities of at least two respective divided recording areas on the optical recording medium, whereby in the case where it is detected that remaining capacity of one recording area has become equal to zero, the area having a remaining capacity is assigned to the area where the remaining capacity has become equal to zero to thereby extend the one area to allow occupation ratio of the respective areas to be variable, thus to perform management of remaining capacities of the respective recording areas by the area management unit to record, by the recording unit, the moving picture video signal and the still picture video signal which are obtained by the image pick-up unit into different recording areas on the optical recording medium.

In the present invention, e.g., boundary pointer indicating the boundary between respective two divided recording areas on the optical recording medium is recorded into the management area except for the recording areas to extend the area by change of the boundary pointer.

Moreover, in the present invention, e.g., in the case where mirror surfaces exist within a predetermined area from the innermost circumference and within a predetermined area from the outermost circumference of the optical recording medium in the process of initialization of the optical recording medium, data recording onto the optical recording medium and taking-out of the optical recording medium, areas corresponding thereto are caused to undergo padding.

In the present invention, recording areas on the recording medium are formed in different areas every data kind, thereby making it possible to collectively handle data of the same system. Further, occupation ratio of the respective areas is caused to be variable, thereby making it possible to properly use areas flexibly in accordance with request from user. Thus, the recording areas can be effectively utilized.

In addition, in the present invention, in the case where mirror surfaces exist within a predetermined area from the innermost circumference and within a predetermined area from the outermost circumference of the optical recording medium in the process of initialization of the optical recording medium, data recording onto the optical recording medium and taking-out of the optical recording medium, areas corresponding thereto are caused to undergo padding, thereby making it possible to produce (manufacture) optical recording media having high compatibility with respect to widely used optical recording medium reproducing apparatuses.

Still further objects of the present invention and practical merits obtained by the present invention will become more apparent from the embodiments which will be explained below with reference to the attached drawings.

BRIEF DESCRIPTION OF THE DRAWINGS

FIGS. 5A to 5C are views showing recording of data, taking-out of recording medium and finalize processing in the image pick-up apparatus.

BEST MODE FOR CARRYING OUT THE INVENTION

Embodiments of the present invention will now be described in detail with reference to the attached drawings. It should be noted that it is a matter of course that the present invention is not limited to examples described below, but modification or changes may be made as occasion demands within the scope which does not depart from the gist of the present invention.

Figure 1:
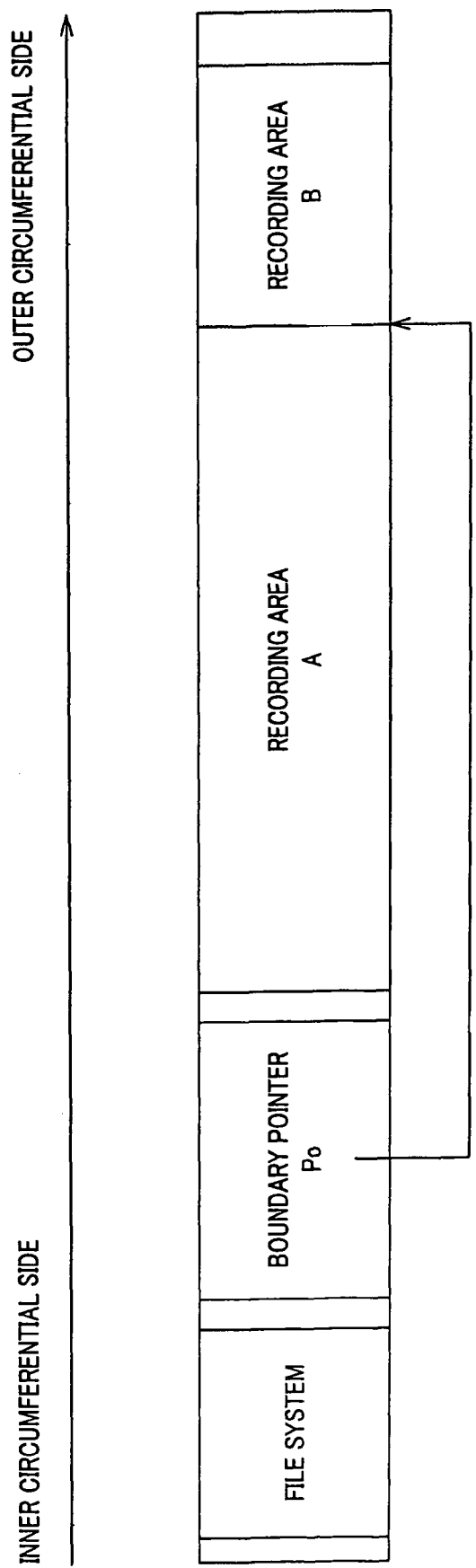
FIG. 1 is a view showing, in a model form, recording area of optical recording medium adapted so that recording area of the recording medium is divided to record moving picture and still picture into different recording areas.
Figure 2:
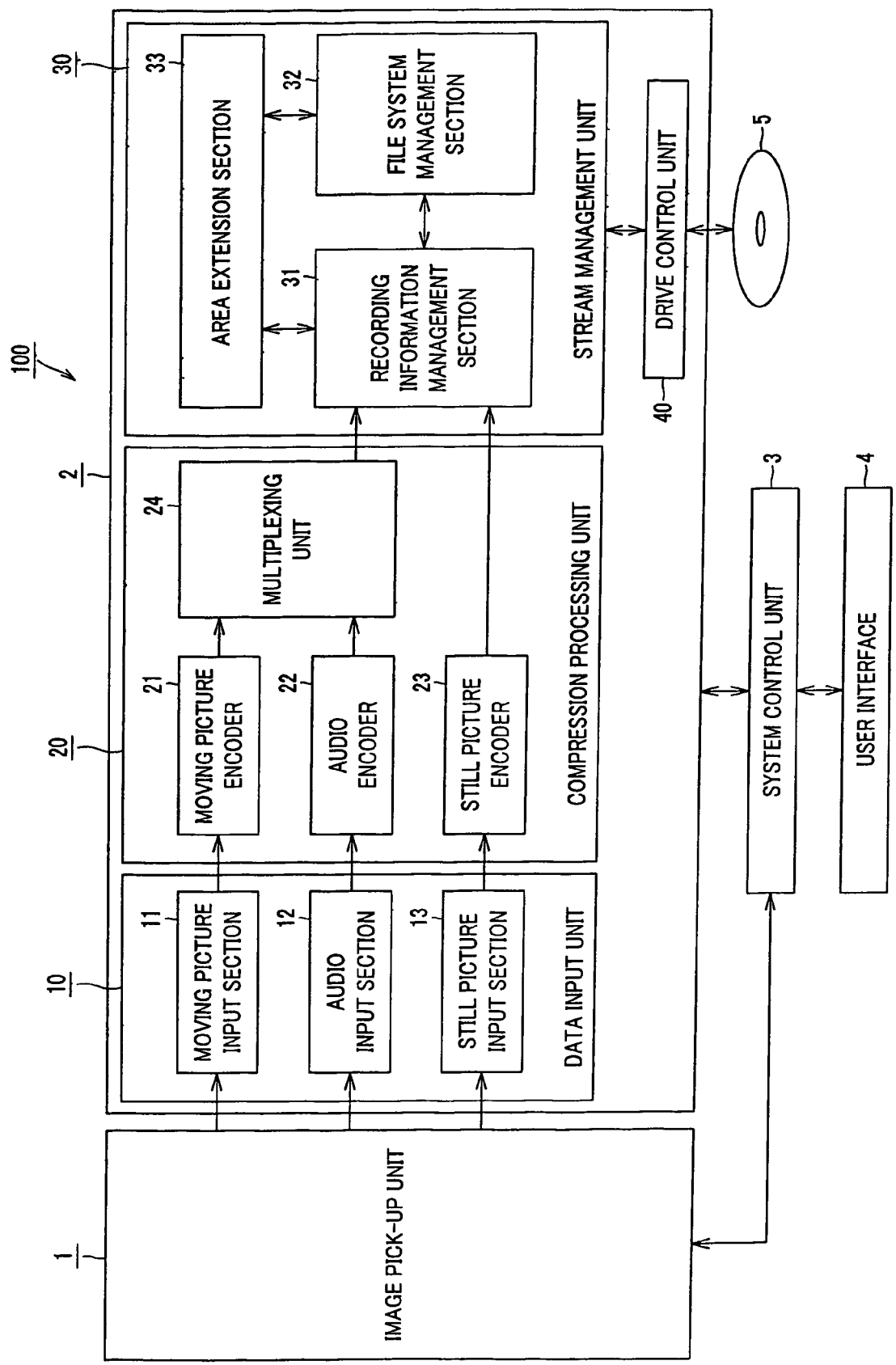
FIG. 2 is a block diagram showing the configuration of an image pick-up apparatus to which the present invention is applied.

The present invention is applied to, e.g., an image pick-up apparatus 100 having the configuration as shown in FIG. 2.

The image pick-up apparatus 100 is directed to the so-called video camera comprising an image pick-up unit 1 for picking up image of an object, a recording unit 2 supplied with a moving picture video signal, an audio signal and/or a still picture video signal from the image pick-up unit 1, a system control unit 3 for performing operation controls of the image pick-up unit 1 and the recording unit 2, and a user interface 4 connected to the system control unit 3, etc., and serves to record, onto an optical recording medium 5, by the recording unit 2, moving picture video signal, audio signal and/or still picture video signal which are obtained by the image pick-up unit 1.

In the image pick-up apparatus 100, the recording unit 2 is composed of a data input unit 10 connected to the image pick-up unit 1, a compression processing unit 20 connected to the data input unit 10, a stream management unit 30 connected to the compression processing unit 20, and a drive control unit 40 connected to the stream management unit 30.

The data input unit 10 is composed of a moving picture input section 11, an audio input section 12, and a still picture input section 13, and serves to convert moving picture video signal, audio signal, still picture video signal, and/or input signal or signals from other external equipment or equipments which is or are delivered from the image pick-up unit 1 into digital signals to thereby obtain moving picture data, audio data and/or or still picture data to output those data to the compression processing unit 20.

The compression processing unit 20 is composed of a moving picture encoder 21, an audio encoder 22, a still picture encoder 23, and a multiplexing unit 24, and serves to encode data which have been received from the data input unit 10 to output the data thus encoded to the stream management unit 30. In this example, in the case where data which have been delivered from the data input unit 10 are moving picture data and audio data, multiplexing operation thereof is performed by the multiplexing unit 24. Thus, the compression processing unit 20 outputs the multiplexed data thus obtained as video data.

The stream management unit 30 is composed of a recording information management section 31, a file system management section 32, and an area extension section 33, and serves to output data which have been received from the compression processing unit 20 to a drive control unit 40 through the recording information management section 31 or the file system management section 32.

The recording information management section 31 serves to add information necessary in various standards employed at the optical recording medium 5 to data which have been received from the compression processing unit 20. Moreover, the recording information management section 31 outputs, as recording data management information shown in FIG. 3, various management information necessary in various standards employed at the optical recording medium 5 and/or management information relating to recording data in addition to inputted data.

The file system management section 32 outputs, to the drive control unit 40, instruction relating to recording position, etc. and/or file system information of data which has been outputted from the recording information management section 31. In this example, in the case where input data is video data, the file system management section 32 instructs recording into the video recording area ARV shown in FIG. 3. In the case where input data is still picture data, the file system management section 32 instructs recording into the still picture recording area ARS.

Moreover, the recording information management section 31 and the file system management section 32 serve to receive, through the drive control unit 40, recording data management information and/or file system information which are included in management area ARM recorded on the optical recording medium 5 to analyze those information to determine respective recordable remaining capacities of the video recording area ARV and the still picture recording area ARS to notify their results to the area extension section 33.

The area extension section 33 serves to confirm remaining capacities of respective recording areas which have been notified by the recording information management section 31 and the file system management section 32. In the case where it is detected that remaining capacity of one area has become equal to zero, the area extension section 33 serves to assign other empty area to the area where the remaining capacity has become equal to zero to thereby extend the recording area. The detail of the operation of the area extension section 33 will be described later.

The drive control unit 40 serves to record data which has been received from the stream management unit 30 at a suitable position of the optical recording medium 5 in accordance with instruction of the file system management section 32.

The user interface 4 serves to accept user request such as recording start/stop, etc. to output instruction to the system control unit 3. Moreover, input switching between video signal consisting of moving picture video signal and audio signal and still picture video signal is performed also through the user interface 4.

The system control unit 3 receives the instruction from the user interface 4 to perform controls of respective units in accordance with the instruction to control the operation of the entirety of the system.

Figure 3:
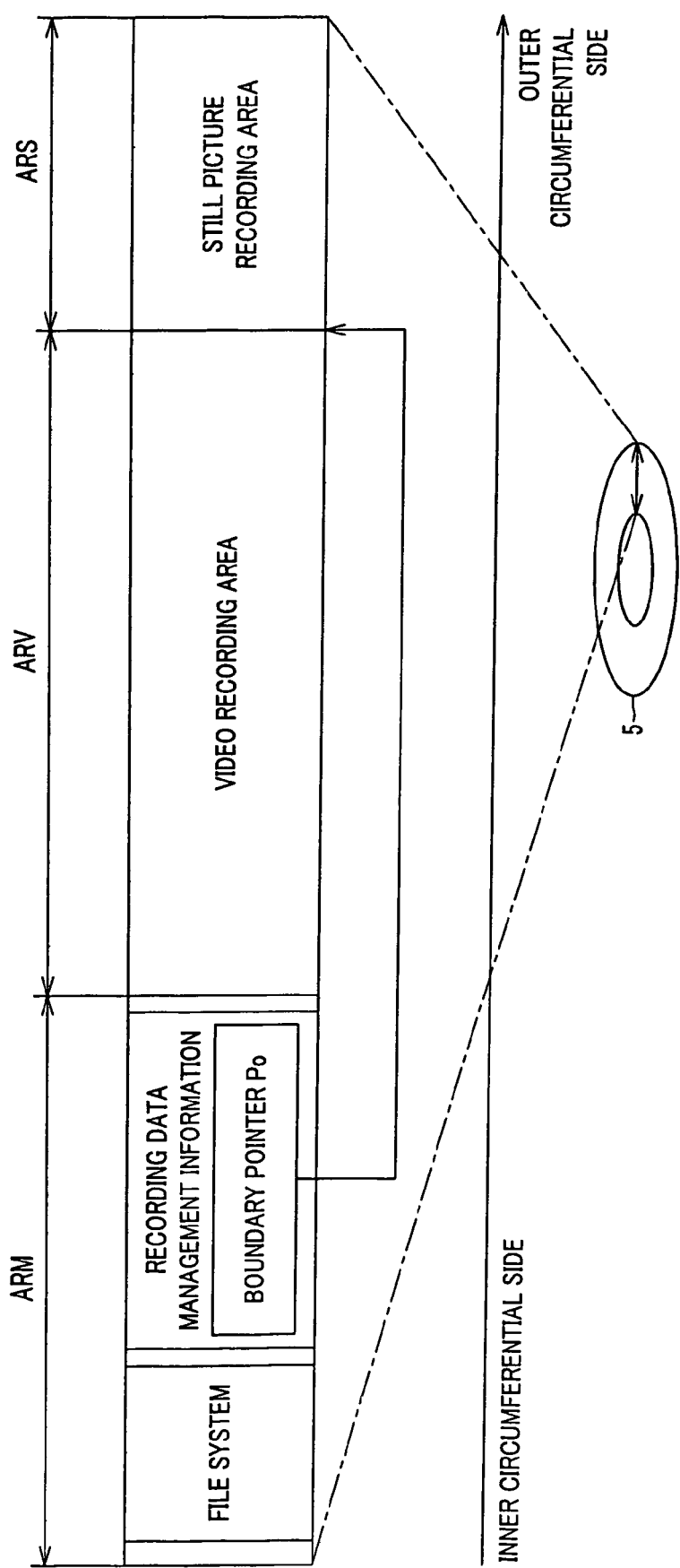
FIG. 3 is a view showing, in a model form, recording areas of optical recording medium used in the image pick-up apparatus.

In the image pick-up apparatus 100, in the case where the optical recording medium 5 is in completely unused state, or instruction from user is given in recording data onto the optical recording medium 5, the optical recording medium 5 is initialized. Further, at the time of initialization, as shown in FIG. 3, the recording area of the optical recording medium 5 is divided into video recording area ARV and still picture recording area ARS. The boundary therebetween is pointed out by the boundary pointer Po included in recording data management information recorded in management area ARM on the optical recording medium 5 as shown in FIG. 3.

Then, a method of initializing the optical recording medium 5 in the image pick-up apparatus 100 will be explained. In the image pick-up apparatus 100, recording type DVD is used as the optical recording medium 5. It is to be noted that, in the following description, completely unused area on the optical recording medium 5 is called mirror surface, and an operation to record arbitrary data to thereby eliminate the mirror surface is called padding.

Figure 4A:
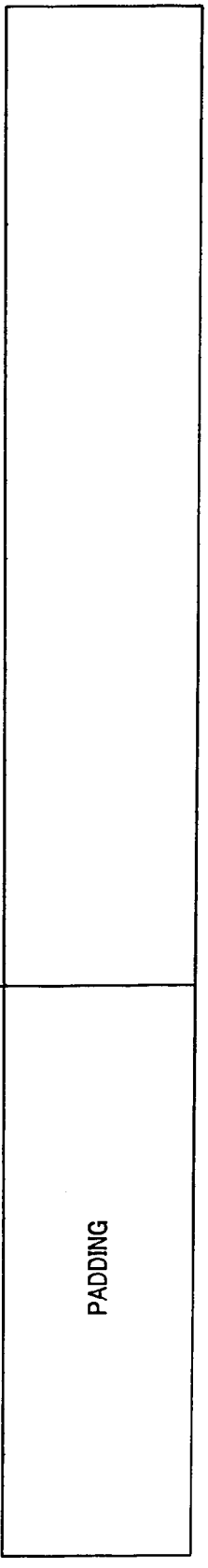
FIGS. 4A and 4B are views showing initialization processing of optical recording medium used in the image pick-up apparatus.
Figure 4B:
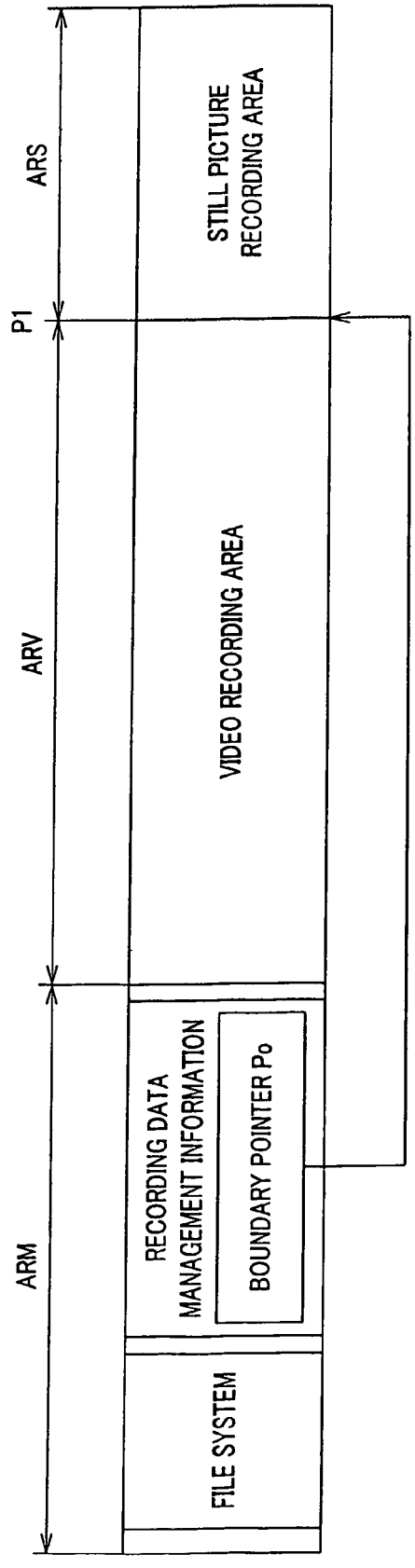

In the case of initializing the optical recording medium 5, padding is initially performed up to start position Po of the data recording area as shown in (A) of FIG. 4. Then, as shown in (B) of FIG. 4, recording data management information and file system information are recorded into the area which has been caused to undergo padding. The recording data management information is information to be recorded in management area ARM for recording management information relating to recording data, and value indicating boundary position P1 between the video recording area ARV and the still picture recording area ARV (hereinafter this value will be referred to as boundary pointer Po) is set therewithin. The inner circumferential side is assigned as the video recording area ARV, and the outer circumferential side is assigned as still picture recording area ARS.

Further, in the image pick-up apparatus 100, in the case where data is recorded onto the optical recording medium 5 which has been initialized by the above-mentioned technique, when inputted data is video data, that video data is recorded into the video recording area ARV, and when inputted data is still picture, that still picture is recorded into the still picture recording area ARS as shown in (A) of FIG. 5. Start positions of recording are caused to be leading portions of respective areas therewithin, and recording is performed in a direction from the inner circumferential side toward the outer circumferential side. After recording is completed, recording data management information and/or file system information are updated as occasion demands.

Moreover, in the image pick-up apparatus 100, in the case where mirror surfaces are left in the still picture recording area (ARSp), a predetermined area (ARVp2) of the inner circumferential side from the still picture area start position, and/or a predetermined area (ARVp1) from the outermost circumferential position of data recorded in moving picture recording area ARV on the optical recording medium 5 as shown in (B) of FIG. 5, those mirror areas are caused to undergo padding. Further, as occasion demands, recording data management information and file system information of the management area ARM are updated.

Further, in the image pick-up apparatus 100, in the case where instruction of finalize processing is given from user, finalize processing is executed with respect to the optical recording medium 5. In the finalize processing, as shown in (C) of FIG. 5, recording data management information and/or file system information included in the management area ARM of the optical recording medium 5 are reconstructed so that they are adapted to the standard used in general optical recording medium reproducing device. In addition, in the case where mirror surfaces are left on the optical recording medium 5, those areas are all caused to undergo padding.

Further, when recording operation is continued in the image pick-up apparatus 100, the recordable remaining capacity becomes equal to zero after all. Here, the case where the remaining capacity of the still picture recording area ARS has become equal to zero earlier than that of the video recording area ARV is considered. If sufficient empty area exists in the video recording area ARV at this time point, the video recording area ARV is assigned to the still picture recording area ARS in the image pick-up apparatus 100, thereby making it possible to extend the still picture recording area ARS. This technique will be explained below in concrete terms.

Initially, as size of the area to be assigned from the video recording area ARV to the still picture recording area ARS, a predetermined extension size is set in advance.

Figure 6A:
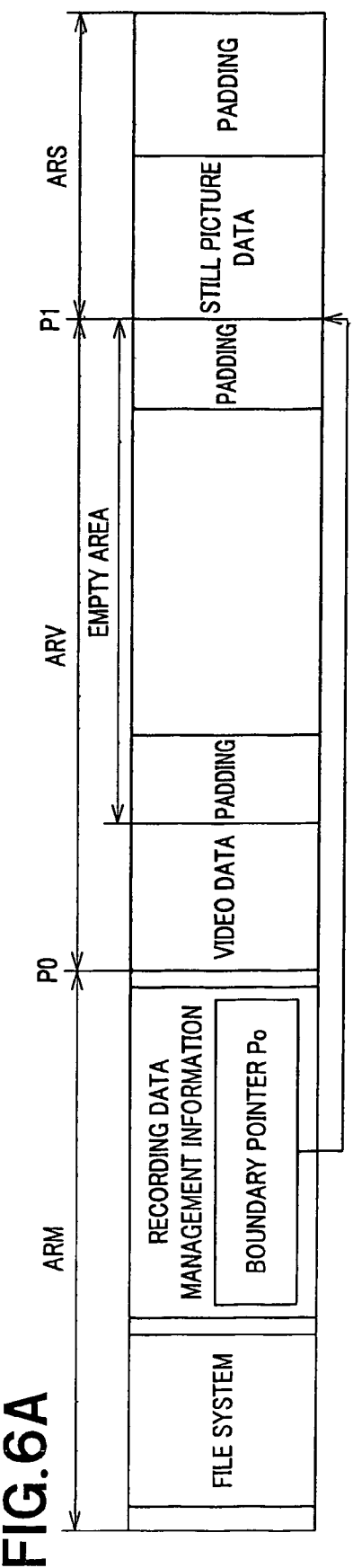
FIGS. 6A to 6C are views showing extension processing of still picture recording area on recording medium used in the image pick-up apparatus.
Figure 6B:
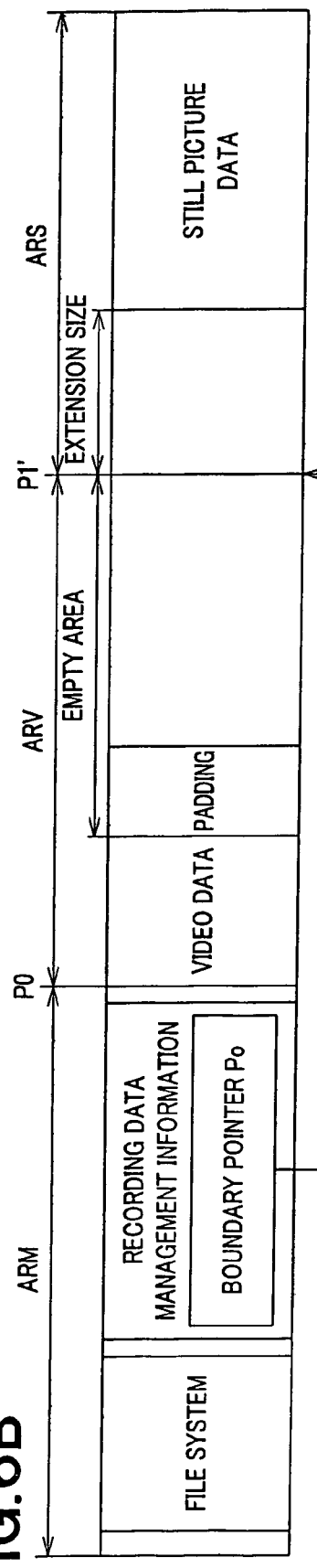
Figure 6C:
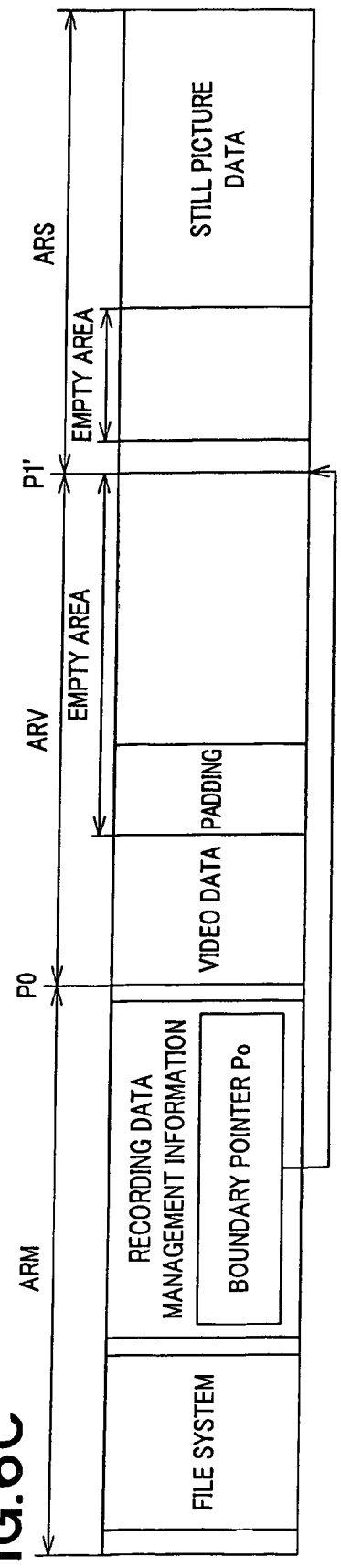

In the case where recording of still picture data is started so that there is no remaining capacity in attempting to make recording into corresponding recording area, the remaining capacity of the video recording area ARV is first confirmed. If the remaining capacity of the video recording area ARV is larger than the extension size which is set in advance, the area corresponding to the extension size which has been set in advance from the outer circumferential side of the video recording area ARV is assigned to the still picture recording area ARS ((A)→(B) in FIG. 6).

In this instance, the area extension section 33 in the image pick-up apparatus 100 serves to modify the boundary pointer included in recording data management information recorded in the management area ARM of the optical recording medium 5 through the recording information management section 31 and the file system management section 32 so as to point out boundary position p1' between the video recording area ARV and the still picture recording area ARV to further modify recording data management information and/or file system information which are related thereto.

After extension of the area, data recording is continued for a second time. However, in recording data into the extended area, recording operation is performed from the leading position of the boundary toward the outer circumferential direction ((C) in FIG. 6).

In the case where the optical recording medium 5 is taken out after extension of the area, when mirror surfaces are left within a predetermined area of the inner circumferential side from start position of new still picture recording area and still picture recording area also including newly extended area, those areas are caused to undergo padding.

Figure 7A:
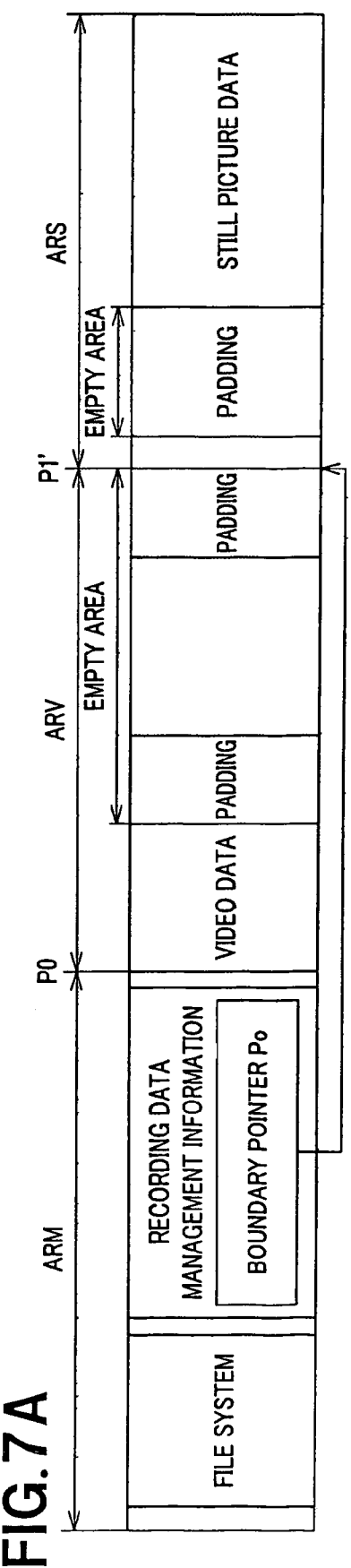
FIGS. 7A to 7C are views showing extension processing of still picture recording area on recording medium used in the image pick-up apparatus.
Figure 7B:
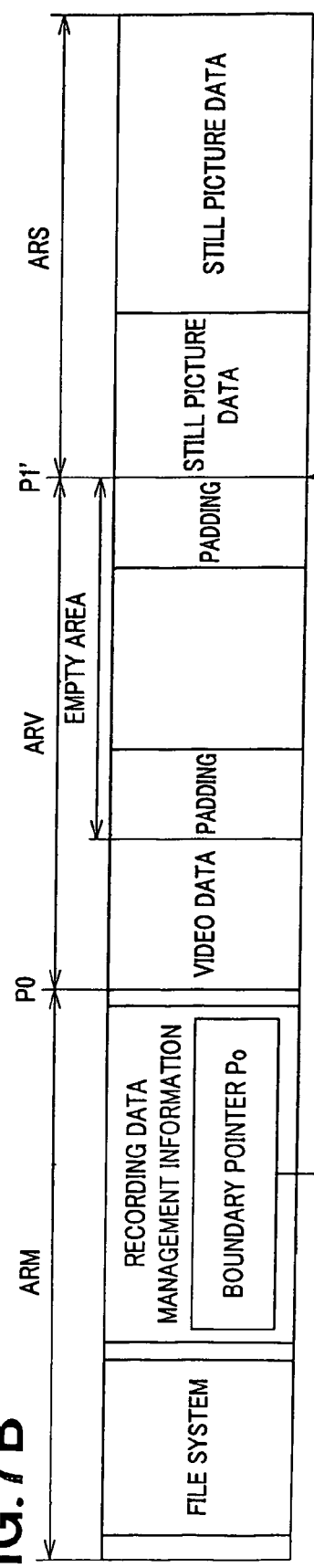
Figure 7C:
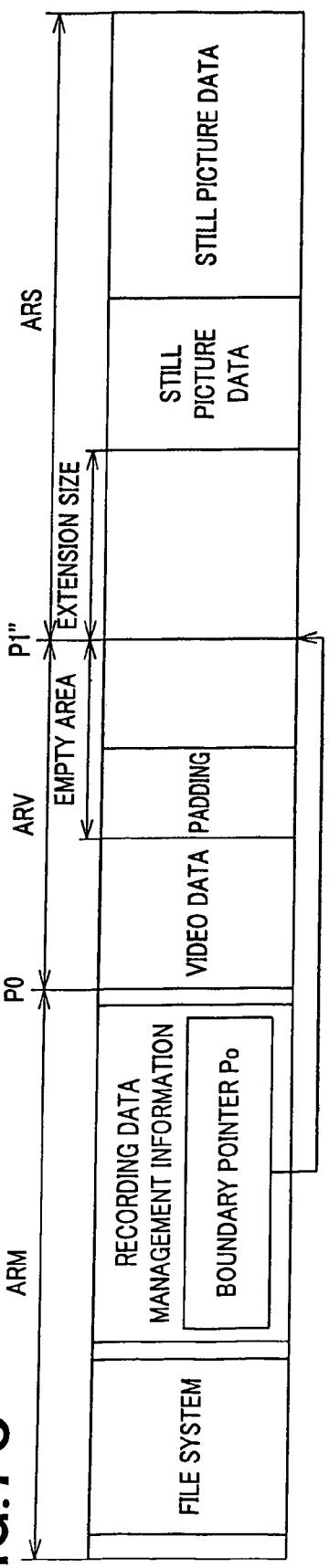

In the case where extended area is completely used for a second time, and empty area of the video recording area is larger than the extension size as shown in (B) in FIG. 7, the boundary pointer is modified so as to point out new boundary position P1" to extend the still picture recording area ARS for a second time ((C) in FIG. 7).

At times subsequent thereto, similar work is repeated until remaining capacities of the video recording area ARV and the still picture recording area ARS both become equal to zero.

Figure 8:
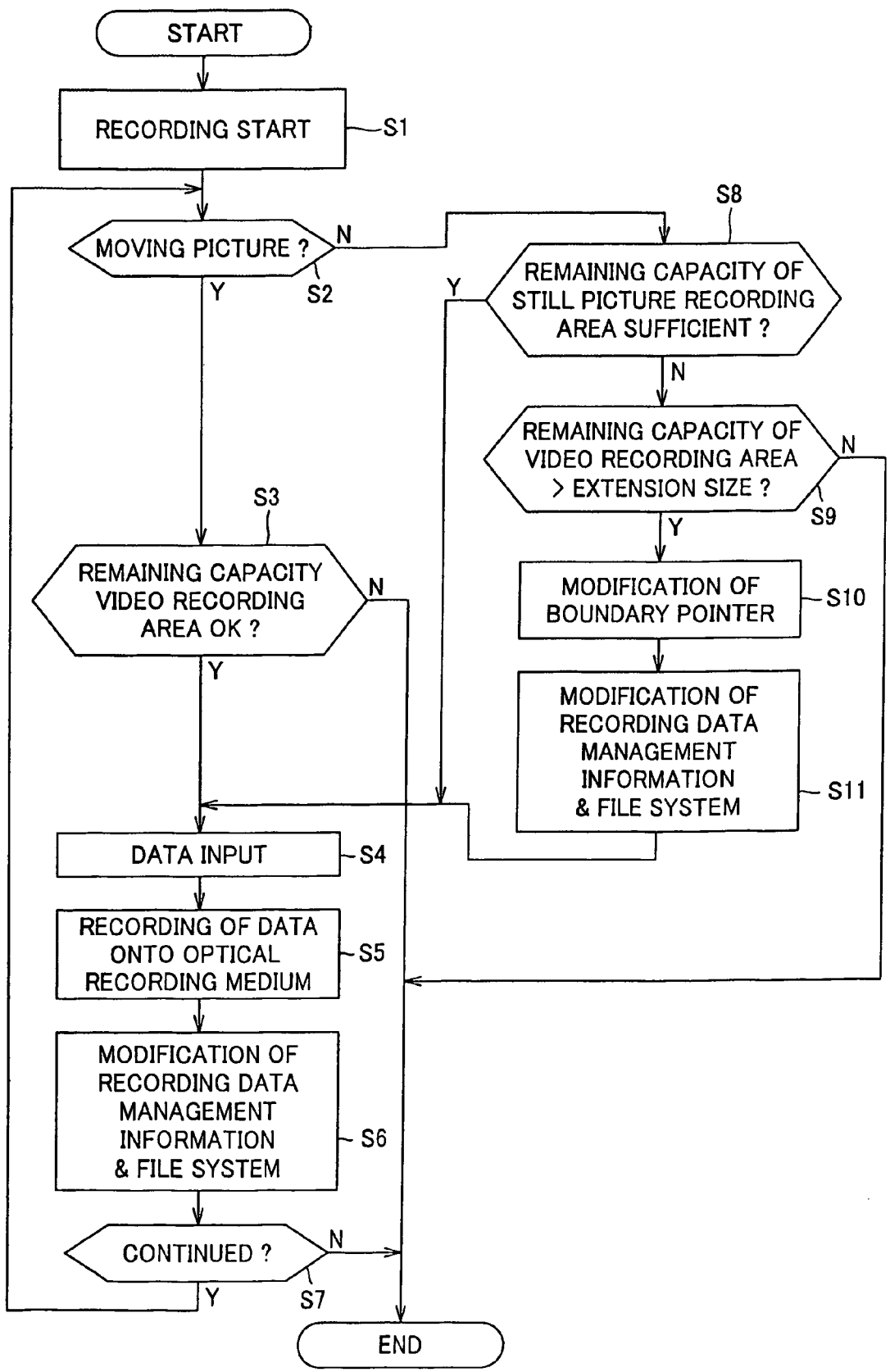
FIG. 8 is a flowchart showing the procedure of recording operation of moving picture and still picture in the image pick-up apparatus.

Namely, when the recording button is pushed down to start image pick-up operation by the image pick-up unit 1 (step S1) as shown in the flowchart of FIG. 8, the recording unit 20 in the image pick-up apparatus 100 serves to judge as to whether or not data inputted from the image pick-up unit 1 is moving picture (step S2). In the case where the inputted data is moving picture, the recording unit 20 serves to confirm the remaining capacity of the video recording area ARV (step S3). Further, in the case where there is remaining capacity of the video recording area ARV, image pick-up data which has been picked up at the image pick-up unit 1 is inputted (step S4) to record the image pick-up data which has been inputted from the image pick-up unit 1, i.e., moving picture data into the video recording area ARV (step S5) to update, as occasion demands, after recording is completed, recording data management information and/or file system information of the management area ARM (step S6) to judge whether or not recording operation is continued (step S7) to return to the step S2 in the case where the recording operation is continued.

Moreover, in the case where inputted data is not moving picture as the result of the judgment of the step S2, whether or not the remaining capacity of the still picture recording area ARS is sufficient is confirmed (step S8). Further, in the case where the remaining capacity of the still picture recording area ARS is sufficient, image pick-up data which has been picked up at the image pick-up unit 1 is inputted (step S4) to record image pick-up data which has been inputted from the image pick-up unit 1, i.e., still picture data into the still picture recording area ARS (step S5) to update, as occasion demands, after recording is completed, recording data management information and/or file system information of the management area ARM (step S6) to judge whether or not the recording operation is continued (step S7) to return to the step S2 in the case where the recording operation is continued.

In this example, judgment as to whether or not the remaining capacity of the still picture recording area ARS is sufficient at the step S8 is performed in a manner described below, for example.

1 The remaining capacity is compared with a predetermined value, whereby in the case where the remaining capacity is lesser than the predetermined value, it is judged that "the remaining capacity is not sufficient".

In the case where there are photographing modes of three stages of high picture quality (HQ)/standard (SP)/low picture quality (LP) as, e.g., still picture photographing mode, the predetermined value is set so that there is ensured empty area sufficient to record still picture of HQ with capacity of still picture which can be photographed in the HQ mode where the capacity is the largest being as criterion.

2 Predetermined values corresponding to the still picture photographing modes are set in advance to compare remaining capacity with a predetermined value corresponding to the selected still picture photographing mode, whereby in the case where the remaining capacity is lesser than that predetermined value, it is judged that "the remaining capacity is not sufficient".

For example, different values are stored in dependency upon still picture photographing modes (HQ/SP/LP) to judge the still picture photographing modes at the step S8 to perform comparison between predetermined value of the judged still picture photographing mode and the remaining capacity.

3 Still image data capacity actually picked up and remaining capacity are compared with each other, whereby in the case where the remaining capacity is lesser than the former, it is judged that "the remaining capacity is not sufficient".

Moreover, in the case where the remaining capacity of the still picture recording area ARS is not sufficient as the result of the judgment of the step S8, whether or not the remaining capacity of the video recording area ARV is larger than the extension size is judged (step S9). In the case where the remaining capacity of the video recording area ARV is larger than the extension size, the boundary pointer is modified (step S10) and recording data management information and file system information are modified (step S11) to thereby extend the still picture recording area ARS. Further, image pick-up data which has been picked up at the image pick-up unit 1 is inputted (step S4) to record image pick-up data which has been inputted from the image pick-up unit 1, i.e., moving picture data into the video recording area ARV (step S5) to update, as occasion demands, after recording is completed, recording data management information and/or file system information of the management area ARM (step S6) to judge whether or not the recording operation is continued (step S7) to return to the step S2 in the case where the recording operation is continued.

At times subsequent thereto, similar work is repeated until remaining capacities of the video recording area ARV and the still picture recording area ARS both become equal to zero.

Here, while it has been described above that in the case where mirror surfaces are left within the still picture recording area (ARSp), a predetermined area (ARVp2) of the inner circumferential side from the still picture area start position, and a predetermined area (ARVp1) from the outermost circumferential position of data recorded in the moving picture recording area ARV, areas corresponding thereto are caused to undergo padding at the time of taking out the optical recording medium 5, such processing may be performed at the time of completion of recording. Moreover, while padding until data recording area start position is first performed at the initialization processing in the image pick-up apparatus 100, that processing may be performed such that only mirror surfaces left after recording data management information and/or file system information are recorded are caused to undergo padding.

Figure 9:
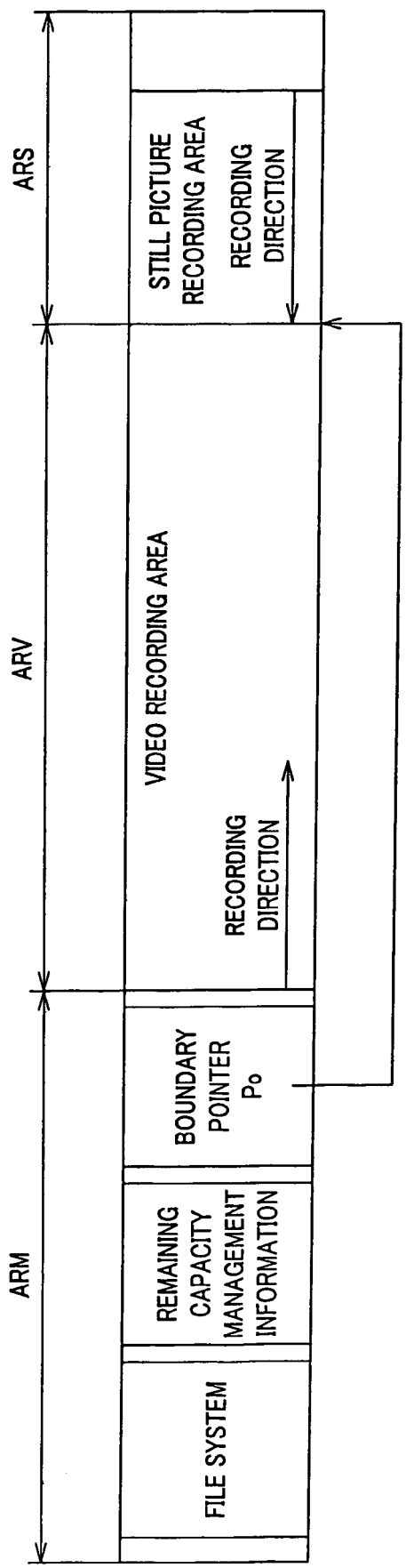
FIG. 9 is a view showing another example of extension processing of still picture recording area on recording medium used in the image pick-up apparatus.

When size of the area to be assigned to the still picture recording area ARS at the time of initializing the optical recording medium 5 is set to recordable minimum unit by the recording unit 2 and extension area size is similarly set to recordable minimum unit in the image pick-up apparatus 100, it is possible to perform recording from the inner circumferential side and the outer circumferential side of the optical recording medium 5 as shown in FIG. 9.

Here, the remaining capacity of the still picture recording area can be calculated by making reference to empty capacity management information included in the file system of the disc.

Figure 10:
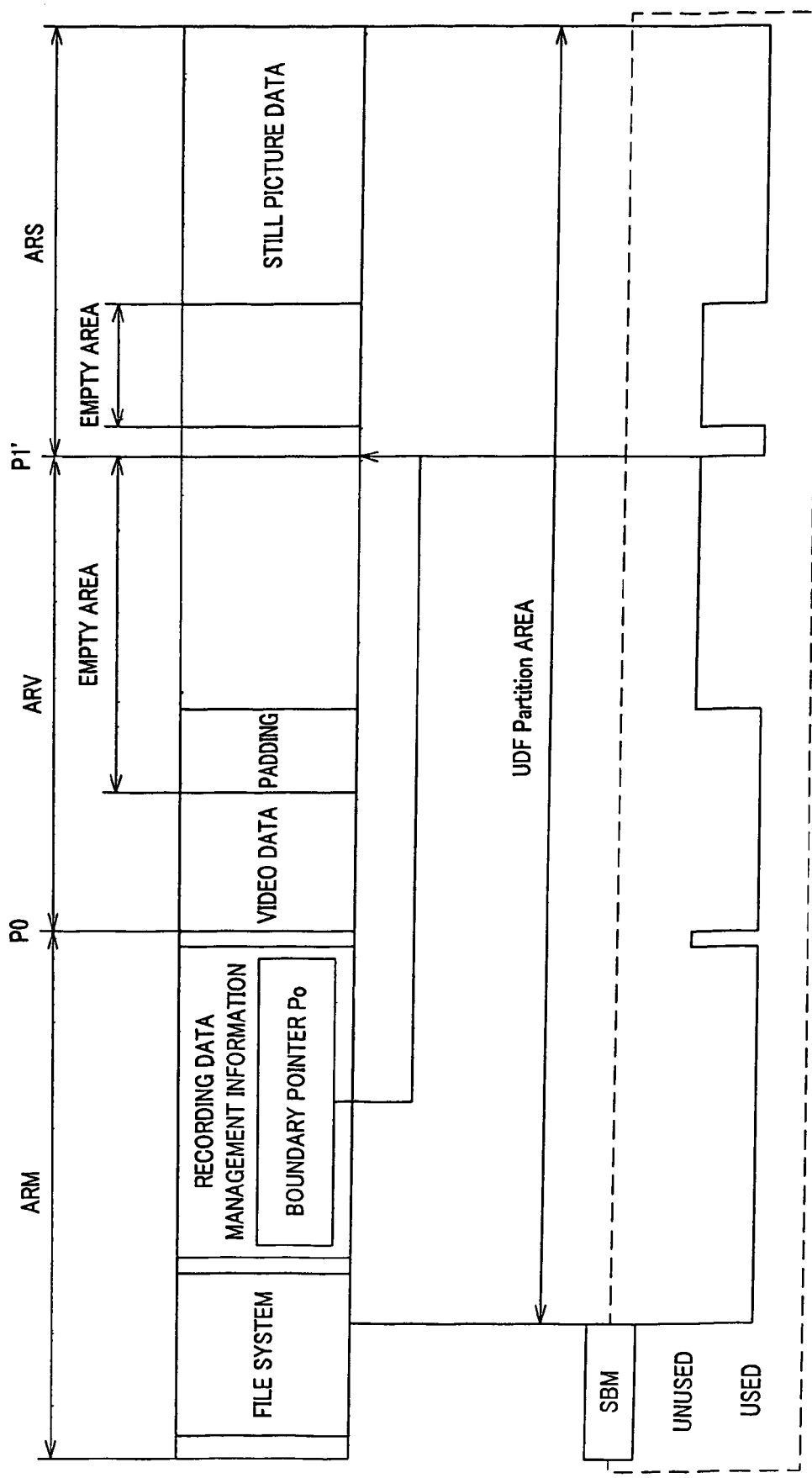
FIG. 10 is a view showing processing for calculating remaining capacity of still picture recording area on recording medium used in the image pick-up apparatus.

For example, in the case of DVD, UDF is used as the file system. In the UDF, area called partition is defined as data recording area on the disc. Management of use state of the partition is performed by information descriptor called Space Bit Map Descriptor (hereinafter referred to as SBD). The SBD has bit map corresponding to respective sectors within the partition. As shown in FIG. 10, in the state where bit indicates "1", it is indicated that corresponding sector is unused, and in the case where bit indicates "0", it is indicated that corresponding sector is already used. Accordingly, the remaining capacity of the still picture recording area can be determined by sum total of bits indicating "unused" among bits corresponding to the still picture recording area×sector size.

Moreover, the remaining capacity of the moving picture recording area can be determined by value obtained by subtracting termination address of video data recorded within the video recording area ARV from address pointed out by the boundary pointer×sector size.

For example, in the UDF, management of data included within partition is performed as file. The UDF has information relating to start addresses and sizes of all files. Management of video data is also performed as file by the UDF. The termination address of the video data file can be determined as termination address of video data.

It should be noted that the remaining capacity of the moving picture recording area may be also determined by using SBD in the same manner as that at the time of calculating the remaining capacity of the still picture recording area.

It is to be noted that while the invention has been described in accordance with certain preferred embodiments thereof illustrated in the accompanying drawings and described in the above description in detail, it should be understood that the invention is not limited to embodiments, but various modifications, alternative constructions or equivalents can be implemented without departing from the scope and spirit of the present invention as set forth and defined by the appended claims.

The invention claimed is:

1. An image pick-up apparatus comprising recording means for recording, onto an optical recording medium, a moving picture video signal and a still picture video signal which are obtained by image pick-up means,
the recording means comprising area management means for performing management of remaining capacities of at least a first recording area for recording the moving picture video signal and a second recording area for recording the still picture video signal on the optical recording medium, whereby in the case where it is detected that remaining capacity of one of the first and second recording areas has become equal to zero, the area management means serves to:
compare the remaining capacity of the other one of the first and second recording areas with a predetermined extension size, and
if the remaining capacity of the other one of the first and second recording areas is larger than the predetermined extension size, assign an area having a size equal to the predetermined extension size in the other one of the first and second recording areas to the one of the first and second recording areas where the remaining capacity has become equal to zero to thereby extend the one of the first and second recording areas to allow occupation ratio of the first and second recording areas to be variable,
thus to perform management of remaining capacities of the first and second recording areas by the area management means to record, by the recording means, the moving picture video signal and the still picture video signal which are obtained by the image pick-up means into different recording areas on the optical recording medium.

2. The image pick-up apparatus as set forth in claim 1, wherein the area management means serves to:
record a boundary pointer indicating a boundary between the first and second recording areas on the optical recording medium into a management area not overlapping with the recording areas, and
extend the one of the first and second recording areas by changing the boundary pointer.

3. The image pick-up apparatus as set forth in claim 1, wherein the area management means is operative so that in the case where mirror surfaces exist within a predetermined area from the innermost circumference and within a predetermined area from the outermost circumference of the optical recording medium in the process of initialization of the optical recording medium, data recording onto the optical recording medium and taking-out of the optical recording medium, the predetermined areas are caused to undergo padding.

* * * * *